Patented Nov. 8, 1932

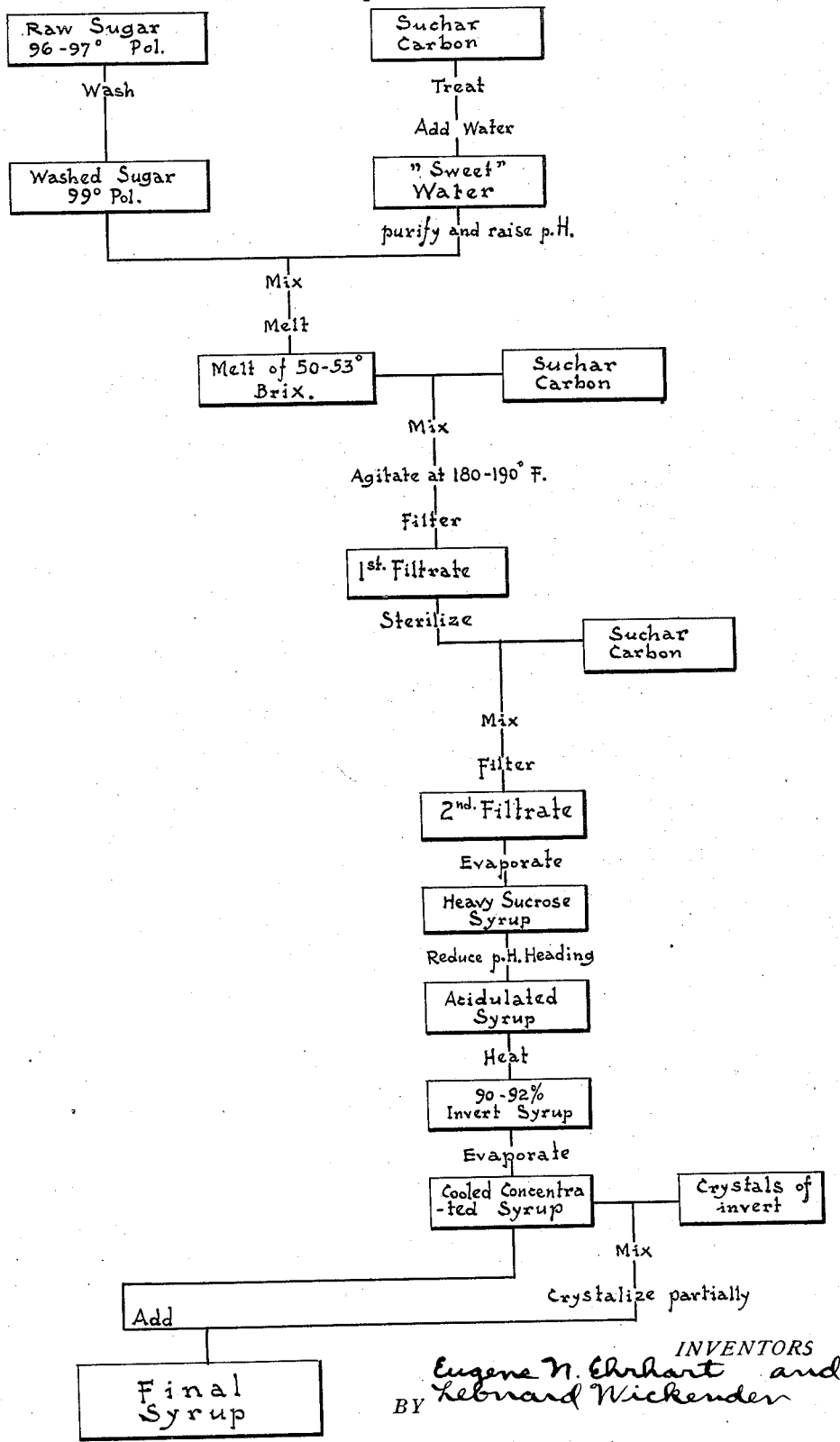

1,886,875

UNITED STATES PATENT OFFICE

EUGENE N. EHRHART, OF NEW ORLEANS, LOUISIANA, AND LEONARD WICKENDEN, OF MANHASSET, NEW YORK, ASSIGNORS TO JOHN J. NAUGLE, OF GREENWICH, CONNECTICUT

PROCESS OF PREPARING INVERT SUGARS

Application filed September 27, 1929. Serial No. 395,526.

Our present invention relates to methods of preparing invert sugar, that is, sugar consisting principally of dextrose and levulose, generally in substantially equal proportions, and aims to devise methods of the general character specified which are simple, which may be easily and conveniently practised, and which are adapted in an altogether economical and successful manner to produce a high-grade invert sugar characterized by its fine color, its fine taste, flavor and odor, its fine consistency, its uniformity and homogeneity, its fine keeping qualities, its high content in dextrose and levulose, and the wide range of uses for which it is admirably adapted. Other objects and advantages of the methods of the present invention, particularly as exemplified in the following illustrative embodiments of the same, will in part be pointed out in detail hereinafter and will in part be obvious to those skilled in the art to which the present invention relates.

In the accompanying specification we shall describe and in the annexed drawing more or less diagrammatically exemplify, several illustrative embodiments of the methods of the present invention. It is, however, to be clearly understood that our invention is not limited to the specific embodiments thereof herein described and more or less diagrammatically exemplified for purposes of illustration only.

Referring to the drawing, in which we have more or less diagrammatically exemplified the aforesaid illustrative embodiments of the methods of the present invention, the single figure of the drawing is a diagrammatic or schematic representation of the aforesaid illustrative embodiments of the methods of the present invention.

Before describing the aforesaid illustrative embodiments of the methods of the present invention, it may be desirable briefly to outline the disadvantages of the prior art to the field of which the present invention relates. Hitherto, in the manufacture of invert sugar for use in the manufacture of bonbons and other confections and candies, it has been customary to use as the starting material refined or granulated sugar. This is a relatively expensive material. Furthermore, by the use of such material the original invert sugar content of the raw sugar from which the refined or granulated sugar was obtained by crystallization was not utilized in the final invert sugar made from the refined or granulated sugar serving as the starting material. The methods hitherto employed have moreover been relatively expensive and the products resulting from the same correspondingly expensive.

These disadvantages are overcome and certain important advantages rendered possible by means of the methods of the present invention, particularly as exemplified in the following illustrative embodiments of the same. In practising the aforesaid illustrative embodiments of the methods of the present invention we use for our raw or starting material raw sugar, preferably raw cane sugar, having an average polarization of from about 96 to about 97 degrees. Ordinarily we use raw cane sugar such as Cuban raws, although, of course, raw cane sugar from other sources, as from Puerto Rico, the Philippines, the Hawaiian Islands, Santo Domingo and Haiti may be used with equal success, as well as raw sugars derived from other sources.

We now proceed to wash the raw sugar. This we may do in centrifugals in accordance with the practise hitherto prevailing. In these centrifugals the sugar is washed to a purity of about 99 degrees polarization. It may here be stated that the initial unwashed raw sugars whose polarization is from about 96 degrees to about 97 degrees contains, in addition to the sucrose, in the case of sugar of 97 degrees polarization, for example, about 1 per cent. of invert sugar, about ½ per cent. of ash, about 1½ per cent. of organic impurities and about 1 per cent. of water. The washed raw sugar on the other hand having a purity of about 99 degrees polarization, contains about 1 per cent. of invert sugar and organic impurities, about ½ per cent. ash and about ½ per cent. water.

The result of the washing operation is therefore to obtain washed raw sugar of the designated purity and composition and the type of syrups known as "affinations". These affinations are preferably boiled in a vacuum pan to obtain raw sugar, the final by-product being molasses. The raw sugar obtained from boiling the affinations is preferably mixed with the incoming raw sugar and washed in the manner already indicated above.

The next step of the operation is the melting of the washed sugar. This is preferably carried out in the following manner: We prefer to carry out the melting operation at a temperature of about 150 degrees F. While the sugar may be melted in pure hot water, we prefer to melt the same in hot "sweet" water, that is, in water which contains some sugar values, as the sugar values derived by treating the purifying and filtering media subsequently described to remove the last traces of sugar therefrom. In either event, however, we prefer that the water used for melting, whether ordinary water or "sweet" water, shall be substantially free from iron. For this purpose we may treat either the ordinary water or the "sweet" water with a suitable reagent, such as a solution of disodium phosphate, to precipitate the iron which may afterwards be removed by decantation or filtration, as desired. We prefer also to treat the ordinary or "sweet" water with an agent which will tend to raise its pH and thus lower the hydrogen ion concentration both of the water used for melting and of the resulting melt.

At this point it may be desirable to point out that whereas the hydrogen ion concentration of the washed raw sugar melt without treatment would ordinarily be from about 6.0 to about 6.5, where the melt has been treated, as by the treatment of the ordinary water or "sweet" water used for melting with disodium phosphate, the pH will be raised to about 7.3 corresponding to a diminished hydrogen ion concentration. This is an important feature if the amount of invert sugar present in the final melt is to be kept at a relatively low figure. Accordingly, we use a slight excess of disodium phosphate, which reagent will therefore serve not only to precipitate iron, but also to raise the pH reading and thus lower the hydrogen ion concentration.

Where, as is preferred, "sweet" water is used for melting the washed raw sugar, the amount of disodium phosphate used, both for precipitating iron and for increasing the pH reading and thus for lowering the hydrogen ion concentration may range from about 20 to about 50 pounds of the crystalline disodium salt per 2000 gallons of "sweet" or other water used for the melting process. This would correspond to from about 8 to about 20 pounds of the anhydrous salt per 2000 gallons of "sweet" or other water used for the melting operation.

We prefer that the density of the resulting melt shall be from about 50 to about 53 degrees Brix. It is desirable in general, of course, to have the melt as concentrated as possible. On the other hand, with a melt of a density exceeding about 53 degrees Brix. we have discovered that the precipitation of the iron and like impurities will be retarded and, if the density of the syrup is much higher, will be almost completely prevented. We have found that working with a density range for the melt of about 50 and about 53 degrees Brix. the desired results can be obtained in the most effective and convenient manner.

The melt thus obtained is now subjected to a further purification to remove undesirable color, taste and odor. While various methods may be employed for this purpose, we prefer among others to employ the following purification operations, since the same will be found to yield a purified syrup of the desired properties, both as to color, taste and odor. In accordance with the aforesaid illustrative embodiments of the methods of the present invention, we may therefore proceed as follows to purify the melt obtained as above described:

We now treat the melt with a suitable amount of a decolorizing carbon, preferably a decolorizing carbon of vegetable origin, such as the highly activated decolorizing carbon known to the trade as "Suchar" described and claimed in United States Letters Patent No. 1,701,272, issued February 5, 1929 to John J. Naugle which is derived from carbonized lignin residues and is adapted to be revivified any number of times with complete restoration of its decolorizing powers. Not only is thus true of the carbon "Suchar" but it also has the additional property, very important for the purposes of the present invention, that it is substantially neutral and will not therefore substantially effect the pH reading of the melt and thus introduce factors which might upset the practise of the process and might increase inversion of the sucrose, factors which generally follow from the use of other types of carbon.

Ordinarily, where "Suchar" is used, we use an amount of "Suchar" equal to about 2 per cent. of the weight of the sugar solids present in the melt. The mixture of melt and suspended carbon is thoroughly agitated in a tank. the melt being preferably heated to and maintained at a temperature of from about 170 to about 200 degrees F., as about 180 or 190 degrees F. The mixture of melt and suspended carbon is now pumped into a suitable filter, such as the well-known type of "auto" filter. The clear liquor coming from the filter is known as the first filtrate and will have often a hydrogen ion concentration corresponding to a pH reading of about 5.0.

The first filtrate is now preferably treated with a suitable sterilizing agent and also with an agent which will render the impurities contained in it more readily amenable to suspension and removal by a subsequent purifying treatment. For this purpose we prefer to treat the first filtrate with an agent which is capable of generating an oxidizing agent in the melt, preferably a nascent oxidizing agent. We prefer to use reagents which will generate chlorine, preferably nascent chlorine, in the melt or hypochlorous acid in the melt. For this purpose we may use a small quantity of bleach liquor, that is, of a solution of hypochlorous acid or calcium hypochlorite, for example, in the form of chloride of lime. The bleach liquor for this purpose may be prepared from solid calcium hypochloride or chloride of lime by stirring the solid with water until all of the soluble matter present has gone into solution. The clear solution thus obtained may now be decanted from the insoluble matter. The proportions used in making the liquid may be about 35 pounds of chloride of lime and about 40 gallons of water. About 18 gallons of the clear liquor may be run through a pipe to the bottom of the tank containing about 3000 gallons of say 52 degrees Brix. melt comprising the first filtrate. This will correspond, for example, to about 15,000 pounds of sugar solids in solution. During all this time the average temperature of the filtrate being treated may be kept at about 180 degrees F. more or less.

The mixture of melt and sterilizing agent may be agitated and then permitted to stand for about 15 minutes in order to permit the sterilizing action to complete itself. At the end of this time any iron calcium present in the melt may be precipitated by the addition of a mixture of monosodium and disodium phosphate. For example, to every three thousand gallons of filtrate at a density of about 52 degrees Brix. may be added about 37½ pounds of disodium phosphate in the crystalline condition, corresponding to approximately 14½ pounds of anhydrous disodium phosphate and about 11 pounds of the monosodium phosphate which is used in the form of the solid. The temperature may be raised at this stage of the operation from about 180 degrees to about 195 degrees F. During and for a brief period after the addition of the monosodium and disodium phosphates or their equivalents, the filtrate being treated is vigorously agitated. After the precipitation is completed, the agitation may be stopped for a period of about 20 minutes in order to permit the precipitates to agglomerate.

Thereafter the mixture may be further agitated and a suitable quantity of a purifying and filtering medium, such as a vegetable decolorizing carbon may be added to the mixture of melt and precipitate. For example, in the case of "Suchar", we may add an amount of decolorizing carbon equal to about 2 per cent. of the weight of the sugar solids present in the melt. The mixture is then pumped through a second auto filter and the clear liquor comprising the second filtrate thus obtained run through a bag filter and then through a felt and paper filter to a storage tank. From the storage tank it may run into an evaporator, where as is usual, it is desired to increase its density or concentration as to about 37 degrees Beaumé corresponding to about 68 degrees Brix.

The hydrogen ion concentration corresponding to certain pH reading varies considerably. As already indicated the pH reading of the raw sugar melt may be equal to about 6.3. The pH reading of the first filtrate may equal about 5.0. The pH reading of the second filtrate is about the same and also the pH reading of the final syrup will be about 5.0 unless it has been changed to raise it to about the point of neutrality, corresponding to a pH reading of about 7.0, by adding trisodium phosphate which will raise the pH reading to the desired point.

The concentration of the syrup preferably takes place under vacuum, the temperature being about 110 degrees F. or less. In those cases where the pH reading is corrected in the evaporator it is desirable to add the trisodium phosphate or its equivalent to the syrup when its density has been raised from about 60 to about 62 degrees Brix.

The heavy sucrose syrups thus obtained containing as it does a moderate percentage, as from one-half to about two per cent. of invert sugar, is now run into a suitable container, for example into a glass-lined jacketed kettle having a capacity of about 2000 gallons of syrup. To this syrup we add a suitable quantity of an agent adapted to invert the sucrose into substantially equal amounts of dextrose and levulose which are the constituents of invert sugar. For example, we may add to 1000 gallons of the syrup described above about 1½ gallons of concentrated hydrochloric acid. This corresponds to about .06 per cent. of hydrochloric acid based on the weight of the sugar solids contained in the batch of 1000 gallons of syrup obtained as above described. The addition of the hydrochloric acid to the syrup reduces its pH reading to about 1.8 corresponding to a considerable hydrogen ion concentration.

The acidulated syrup thus obtained is now suitably heated. The syrup is now heated to a temperature of about 160 degrees F. for a suitable period of time. Ordinarily a treatment of this sort for from about 2 to about 4 hours will result in the inversion of about 90 to about 92 per cent. of the sucrose in the syrup described above. In other words, about 90 per cent. or more of the sucrose contained in the acidulated syrup will be inverted so that the invert sugar content of the final syrup will amount to 90 per cent. more or less of the sugar solids plus the amount of invert sugar present in the original sugar syrup treated. This percentage may sometimes run as high as 94 or 95 per cent.

At this stage it is important to raise the pH reading, that is, to diminish the hydrogen ion concentration of the invert sugar syrup. While this may be done in various ways, we prefer to do this by the addition of trisodium phosphate in a suitable amount to bring the pH reading up to about 4.0. This is preferably done while the syrup is still at an elevated temperature of about 160 degrees F.

The heavy invert sugar syrup thus obtained is now run into a suitable container, as into a glass-lined evaporator. There the invert syrup is concentrated, preferably under a vacuum, from about 82 to about 84 degrees Brix. The highly concentrated invert sugar syrup thus obtained is now run from the evaporator pan through a cooler until its temperature is reduced to normal.

In order to obtain readily and with a considerable saving in time and effort a final invert sugar of the desired consistency and other properties, we prefer to treat the cooled concentrated invert sugar syrup obtained as above described in substantially the following manner; The cooled concentrated invert sugar syrup is preferably seeded, that is, to the cooled concentrated invert sugar syrup are added crystals of invert sugar or of dextrose, the latter, for example, in the form of cerelose which is a commercial form of dextrose. The heavy syrup with the seed crystals contained in it is now run into a continuous beater in which crystallization takes place, the purpose of the seeding operation being to produce a very small crystal and therefore a very small, uniform and homogeneous sugar. The creamy mass of small crystals thus obtained may, if desired, be mixed with sufficient fully inverted syrup obtained as above described of lighter density to reduce the density of the final mixture from about 76 to about 78 degrees Brix.

This completes the description of the aforesaid illustrative embodiments of the methods of the present invention. It will be noted that such methods are simple to practise, may be easily and conveniently practised and result in the production of a high-grade invert sugar directly from raw sugar, thus rendering possible the retention and saving of the invert sugar content of the original raw sugar. This is not possible by the methods of the prior art which employ only refined or granulated sugar for manufacturing invert sugar for confectionery and like uses. The resulting product obtained by means of the methods of the present invention is homogeneous, of fine consistency and of excellent color and flavor. It is furthermore relatively cheap and has a wide variety of uses. Other superiorities and advantages of the methods of the present invention, particularly as exemplified in the aforesaid illustrative embodiments of the same, will readily occur to those skilled in the art to which the present invention relates.

What we claim as our invention is:

The method of preparing invert sugar, which comprises the steps of dissolving raw sucrose sugar in water treating the same with an agent capable of liberating nascent oxygen, purifying the sucrose sugar melt so obtained by treating the same with a vegetable decolorizing carbon, directly inverting substantially all of the sucrose content of the sucrose sugar melt so obtained, concentrating the invert sugar syrup so obtained thereafter adding seed crystals of invert sugar to the resulting concentrated invert sugar syrup and thereafter thinning the resulting invert sugar crystals with concentrated invert sugar syrup.

2. The method of preparing invert sugar, which comprises the steps of dissolving raw sucrose sugar in water treating the same with an agent capable of liberating nascent oxygen, purifying the sucrose sugar melt so obtained, directly inverting substantially all of the sucrose content of the sucrose sugar melt so obtained, concentrating the invert sugar syrup so obtained thereafter adding seed crystals of invert sugar to the resulting concentrated invert sugar syrup and thereafter thinning the resulting invert sugar crystals with concentrated invert sugar syrup.

3. The method of preparing invert sugar, which comprises the steps of washing and then dissolving raw sucrose sugar in water, treating the same with an agent capable of liberating nascent oxygen, purifying the sucrose sugar melt so obtained by treating the same with a vegetable decolorizing carbon, directly inverting substantially all of the sucrose content of the sucrose sugar melt so obtained, concentrating the invert sugar syrup so obtained thereafter adding seed crystals of invert sugar to the resulting concentrated invert sugar syrup and thereafter thinning the resulting invert sugar crystals with concentrated invert sugar syrup.

4. The method of preparing invert sugar, which comprises the steps of washing and then dissolving raw sucrose sugar in water, treating the same with an agent capable of liberating nascent oxygen, purifying the sucrose sugar melt so obtained, directly inverting substantially all of the sucrose content of the sucrose sugar melt so obtained, concentrating the invert sugar syrup so obtained thereafter adding seed crystals of invert sugar to the resulting concentrated invert sugar syrup and thereafter thinning the resulting invert sugar crystals with concentrated invert sugar syrup.

5. The method of preparing invert sugar, which comprises the steps of washing and then dissolving raw sucrose sugar in water, purifying the sucrose sugar melt so obtained, directly inverting substantially all of the sucrose content of the sucrose sugar melt so obtained, concentrating the invert sugar syrup so obtained, adding seed crystals of invert sugar to the resulting concentrated invert sugar syrup, beating the resulting invert sugar crystals, and thereafter thinning the resulting beaten invert sugar crystals with concentrated invert sugar syrup.

6. The method of preparing invert sugar, which comprises the steps of dissolving raw sucrose sugar in water, directly inverting substantially all of the sucrose content of the sucrose sugar melt so obtained, concentrating the invert sugar syrup so obtained, adding seed crystals of invert sugar to the resulting concentrated invert sugar syrup, beating the resulting invert sugar crystals, and thereafter thinning the resulting beaten invert sugar crystals with concentrated invert sugar syrup.

7. The method of preparing invert sugar, which comprises the steps of dissolving raw sucrose sugar in water, purifying the sucrose sugar melt so obtained by treating the same with a vegetable decolorizing carbon, directly inverting substantially all of the sucrose content of the sucrose sugar melt so obtained, concentrating the invert sugar syrup so obtained, adding seed crystals of invert sugar to the resulting concentrated invert sugar syrup, beating the resulting invert sugar crystals, and thereafter thinning the resulting beaten invert sugar crystals with concentrated invert sugar syrup.

8. The method of preparing invert sugar, which comprises the steps of washing and then dissolving raw sucrose sugar in water, directly inverting substantially all of the sucrose content of the sucrose sugar melt so obtained, concentrating the invert sugar syrup so obtained, adding seed crystals of invert sugar to the resulting concentrated invert sugar syrup, beating the resulting invert sugar crystals, and thereafter thinning the resulting beaten invert sugar crystals with concentrated invert sugar syrup.

9. The method of preparing invert sugar, which comprises the steps of washing and then dissolving raw sucrose sugar in water, purifying the sucrose sugar melt so obtained by treating the same with a vegetable decolorizing carbon, directly inverting substantially all of the sucrose content of the sucrose sugar melt so obtained, concentrating the invert sugar syrup so obtained, adding seed crystals of invert sugar to the resulting concentrated invert sugar syrup, beating the resulting invert sugar crystals, and thereafter thinning the resulting beaten invert sugar crystals with concentrated invert sugar syrup.

10. The method of preparing invert sugar, which comprises the steps of dissolving raw sucrose sugar in water, purifying the sucrose sugar melt so obtained, directly inverting substantially all of the sucrose content of the sucrose sugar melt so obtained, concentrating the invert sugar syrup so obtained, adding seed crystals of invert sugar to the resulting concentrated invert sugar syrup, beating the resulting invert sugar crystals, and thereafter thinning the resulting beaten invert sugar crystals with concentrated invert sugar syrup.

11. The method of preparing invert sugar, which comprises the steps of dissolving raw sucrose sugar in water, directly inverting substantially all of the sucrose content of the sucrose sugar melt so obtained, concentrating the invert sugar syrup so obtained, adding seed crystals of invert sugar to the resulting concentrated invert sugar syrup, beating the resulting invert sugar crystals, and thereafter thinning the resulting beaten invert sugar crystals with concentrated invert sugar syrup constituting a portion of the batch of concentrated invert sugar syrup previously prepared.

12. The method of preparing invert sugar, which comprises the steps of dissolving raw sucrose sugar in water, purifying the sucrose sugar melt so obtained, directly inverting substantially all of the sucrose content of the sucrose sugar melt so obtained, concentrating the invert sugar syrup so obtained, adding seed crystals of invert sugar to the resulting concentrated invert sugar syrup, beating the resulting invert sugar crystals, and thereafter thinning the resulting beaten invert sugar crystals with concentrated invert sugar syrup constituting a portion of the batch of concentrated invert sugar syrup previously prepared.

In testimony whereof, we have signed our names to this specification this 13th day of September, 1929.

E. N. EHRHART.
LEONARD WICKENDEN.